(12) United States Patent
Dell'Orto et al.

(10) Patent No.: US 11,402,673 B2
(45) Date of Patent: Aug. 2, 2022

(54) WAVEGUIDE ARRAY

(71) Applicant: Lumentum Technology UK Limited, Towcester (GB)

(72) Inventors: Flavio Dell'Orto, Desio (IT); Stefano Balsamo, Towcester (GB); Paolo Vergani, Vimercate (IT)

(73) Assignee: Lumentum Technology UK Limited, Northamptonshire (GB)

( * ) Notice: Subject to any disclaimer, the term of this patent is extended or adjusted under 35 U.S.C. 154(b) by 0 days.

(21) Appl. No.: 16/474,973

(22) PCT Filed: Dec. 21, 2017

(86) PCT No.: PCT/GB2017/053863
§ 371 (c)(1),
(2) Date: Jun. 28, 2019

(87) PCT Pub. No.: WO2018/122551
PCT Pub. Date: Jul. 5, 2018

(65) Prior Publication Data
US 2019/0346706 A1  Nov. 14, 2019

(30) Foreign Application Priority Data
Dec. 30, 2016 (GB) .................................. 1622436

(51) Int. Cl.
*G02B 6/12* (2006.01)
*G02F 1/035* (2006.01)
(Continued)

(52) U.S. Cl.
CPC ........ *G02F 1/0316* (2013.01); *G02B 6/12011* (2013.01); *G02F 1/035* (2013.01); *G02F 1/225* (2013.01)

(58) Field of Classification Search
None
See application file for complete search history.

(56) References Cited

U.S. PATENT DOCUMENTS 6,801,675 B2 * 10/2004 Doi ....................... G02F 1/2255
385/2
7,801,400 B2 * 9/2010 Sugiyama ............... G02F 1/035
385/32

(Continued)

FOREIGN PATENT DOCUMENTS

EP 1542063 A1 6/2005

OTHER PUBLICATIONS

PCT International Search Report and Written Opinion corresponding to PCT/GB2017/053863, dated Mar. 1, 2018, 8 pages.

*Primary Examiner* — Chris H Chu
(74) *Attorney, Agent, or Firm* — Harrity & Harrity, LLP

(57) ABSTRACT

There is described an RF waveguide array. The array comprises a substrate comprising a plurality of optical waveguides, each waveguide being elongate in a first direction. An electrical RF transmission line array is located on a face of the substrate and comprises a plurality of signal electrodes and a plurality of ground electrodes, each electrode extending in the first direction. Each signal electrode is positioned to provide a signal to two respective waveguides. The ground electrodes include at least one intermediate ground electrode positioned between each pair of signal electrodes. Each intermediate ground electrode includes a portion extending into the substrate.

17 Claims, 4 Drawing Sheets

(51) Int. Cl.
*G02F 1/225* (2006.01)
*G02F 1/03* (2006.01)

(56) References Cited

U.S. PATENT DOCUMENTS

| | | | |
|---|---|---|---|
| 8,923,657 B2* | 12/2014 | Huang | G02F 1/225 |
| | | | 385/2 |
| 2002/0146190 A1* | 10/2002 | Doi | H04B 10/505 |
| | | | 385/14 |
| 2004/0184755 A1* | 9/2004 | Sugiyama | G02B 6/1342 |
| | | | 385/129 |
| 2006/0147145 A1* | 7/2006 | Shinriki | G02F 1/0305 |
| | | | 385/3 |
| 2010/0329600 A1* | 12/2010 | Sugiyama | G02B 6/29352 |
| | | | 385/2 |

* cited by examiner

WAVEGUIDE ARRAY

CROSS-REFERENCE TO RELATED APPLICATIONS

This application is a 371 national stage of PCT Application No. PCT/GB2017/053863, filed on Dec. 21, 2017 and entitled "WAVEGUIDE ARRAY," which claims priority to United Kingdom Patent Application No. 1622436.2, filed on Dec. 30, 2016 and entitled "WAVEGUIDE ARRAY," which are incorporated by reference herein.

FIELD OF THE INVENTION

The invention relates to components for use in RF optical apparatus. In particular the invention relates to a waveguide array, for example for use in a dual parallel modulator.

BACKGROUND

A dual parallel I/Q (in phase/quadrature) modulator typically has the structure schematically shown in FIG. 1. The signal enters a splitter 101, which divides the signal into each channel of four Mach-Zehnder modulators 110, each of which comprises two waveguides 111, and an electrical RF (radio frequency) transmission line 112. The modulators apply the required modulation, and the signal is recombined by a combiner 102.

The Mach-Zehnder modulator has a cross section along A as shown in FIG. 2. The waveguide section of the Mach-Zehnder modulator comprises a substrate 201, which contains waveguides 202. The RF transmission line array 203 is placed on one face of the substrate. Each RF transmission line comprises a signal electrode 204. Each signal electrode 204 has a ground electrode 205 on either side. The modulators may either be arranged x-cut (210), with the waveguides positioned below the gaps between the signal and ground electrodes (symmetrically around the signal electrode), or z-cut (220) with one waveguide beneath the signal electrode, and one beneath one of the ground electrodes. Normally, all modulators in an array would be the same type, but both z- and x-cut modulators are shown in FIG. 2 for illustration. Ground electrodes are typically shared between adjacent RF transmission lines.

SUMMARY

In accordance with one aspect of the present invention there is provided an RF waveguide array. The array comprises a substrate comprising a plurality of optical waveguides, each waveguide being elongate in a first direction. An electrical RF transmission line array is located on a face of the substrate and comprises a plurality of signal electrodes and a plurality of ground electrodes, each electrode extending in the first direction. Each signal electrode is positioned to provide a signal to two respective waveguides. The ground electrodes include at least one intermediate ground electrode positioned between each pair of signal electrodes. Each intermediate ground electrode includes a portion extending into the substrate.

Further aspects and preferred features are set out in claim 2 et seq.

DETAILED DESCRIPTION

Figure 1:
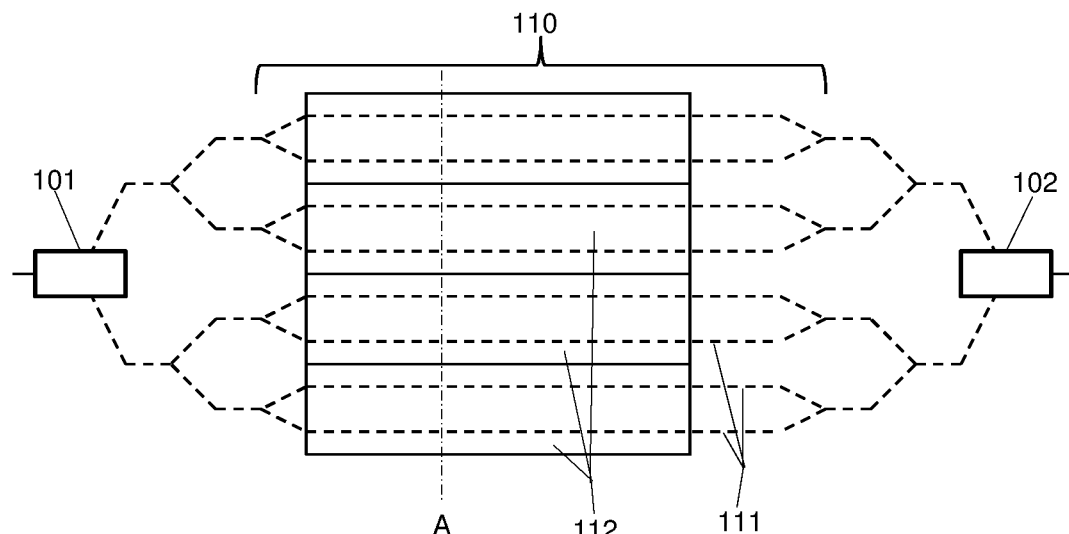
FIG. 1 is a schematic representation of a dual parallel I/Q (in phase/quadrature) modulator.
Figure 2:
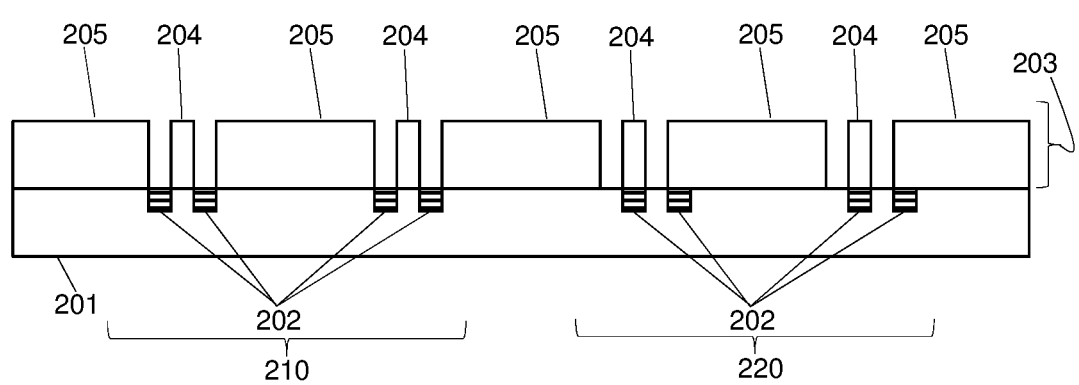
FIG. 2 is a cross section through the modulator of FIG. 1.

"Length" and "along" are used herein to refer to distance in the direction of travel of the RF signals in the RF transmission lines—i.e. "out of the page" in FIG. 2. "Height", "up", and "down" are used herein to refer to distance in a direction perpendicular to the face of the substrate to which the RF transmission lines are attached—i.e. vertically in FIG. 2, with "down" being towards the substrate. "Width" and "across" are used to refer to distance in a direction perpendicular to both height and length—i.e. horizontally in FIG. 2, unless otherwise specified.

Figure 3:
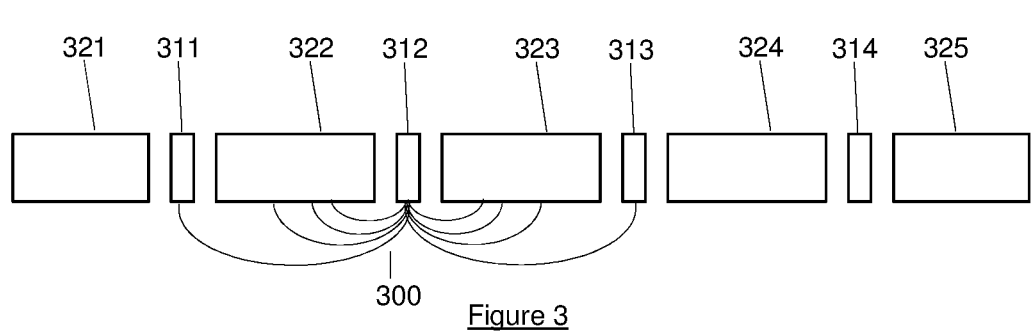
FIG. 3 is a schematic illustration of electric field lines in the modulator of FIG. 2.

FIG. 3 shows the electric field line distribution of the RF waveguide array shown in FIG. 2 (the substrate and waveguides are omitted for clarity). Signal electrodes are labelled 311, 312, 313, 314 from left to right, ground electrodes are labelled 321, 322, 323, 324, 325 from left to right. 321 and 325 are edge ground electrodes, 322, 323 and 324 are intermediate ground electrodes. As can be seen from the field lines 300, the signal from the signal electrode 312 extends through the ground electrodes 322 and 323, and to the nearest other signal electrodes 311 and 313. The wide electrical field distribution gives rise to high frequency losses—even in the case of a single transmission line—and the spread of the field to adjacent lines causes unwanted "crosstalk", i.e. interference on one line caused by another.

An electrode structure for reducing the crosstalk is proposed below and shown in FIGS. 4, 5, 6 and 7. Each electrode structure has signal electrodes 400 and waveguides 410. While the figures are shown for a z-cut transmission line array, the same principle applies for an x-cut array. In order to limit the spread of the electrical field, each ground electrode is provided with a downwardly extending portion, which extends into the substrate. This may be achieved by creating a "trench" in the substrate and covering the walls of the trench with metal (e.g. by sputtering) or filling the trench with metal. The metal which is used to cover or fill the trench may be the same metal as the electrodes, or a different metal.

Figure 4:
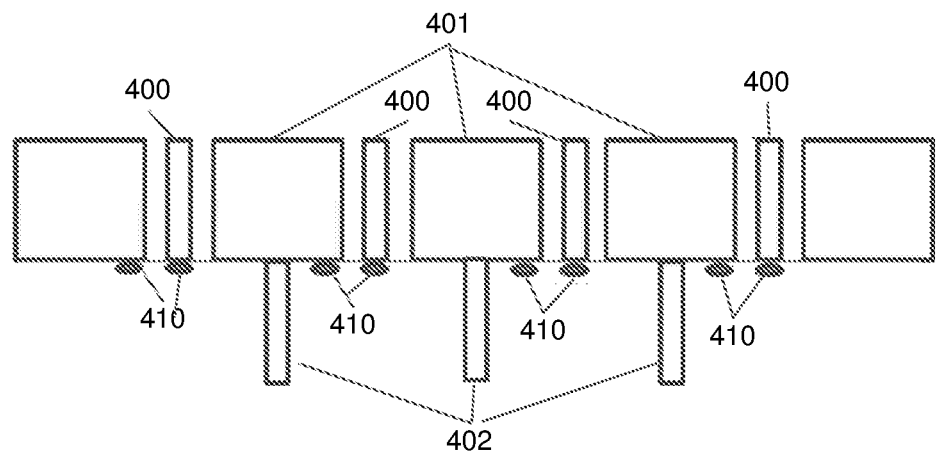
FIG. 4 is a schematic representation of an RF waveguide array.
Figure 5:
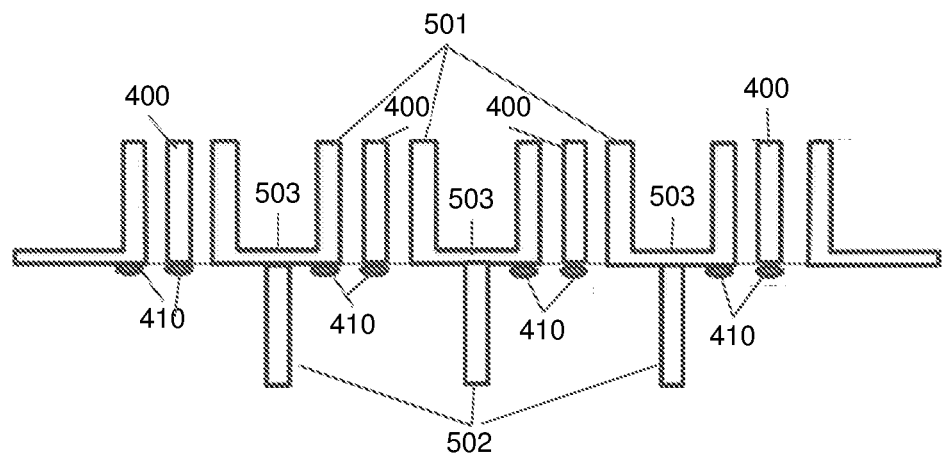
FIG. 5 is a schematic representation of an alternative RF waveguide array.
Figure 6:
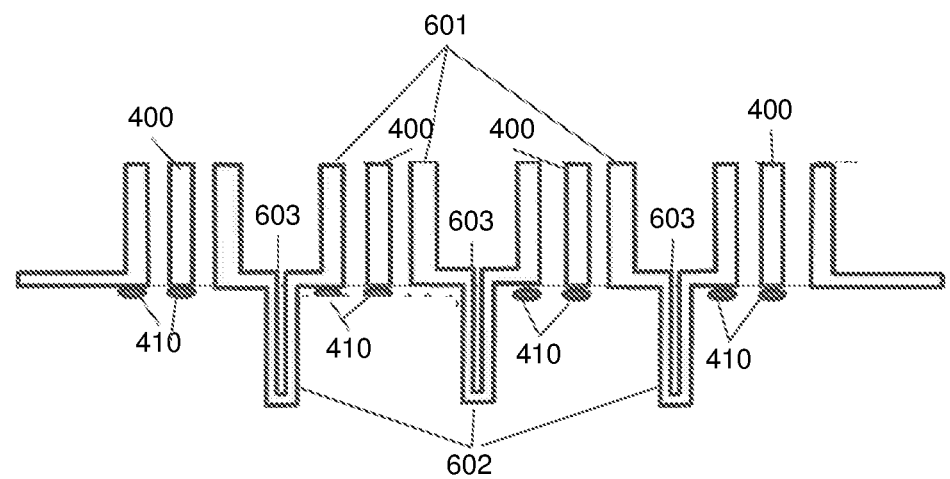
FIG. 6 is a schematic representation of a further alternative RF waveguide array.
Figure 7:
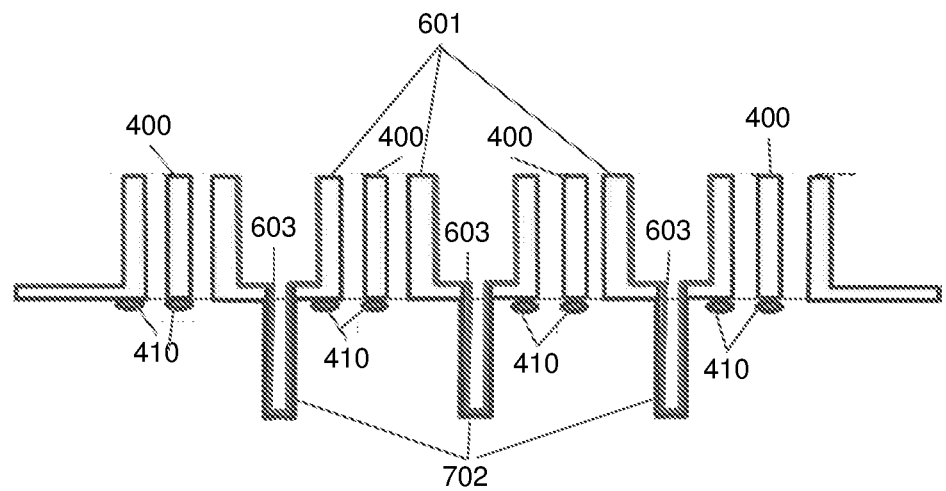
FIG. 7 is a schematic representation of a further alternative RF waveguide array.

FIG. 4 shows an RF waveguide array having ground electrodes 401 with a downwardly extending portion 402 formed by filling a trench in the substrate with metal. FIG. 5 shows a similar arrangement, with each ground electrode 501 having a reduced height portion 503 to save on material costs as well as the downwardly extending portion 502. FIG. 6 shows an embodiment where ground electrodes 601 having a reduced height portion 603 are combined with a downwardly extending portion 602 formed by sputtering metal into a trench of the substrate. The sputtering may take place before or after the main body of the ground electrode is applied to the substrate. FIG. 7 shows an embodiment similar to FIG. 6, except that the metal 702 used for the sputtering is not the same as that used for the rest of the electrode.

Figure 8A:
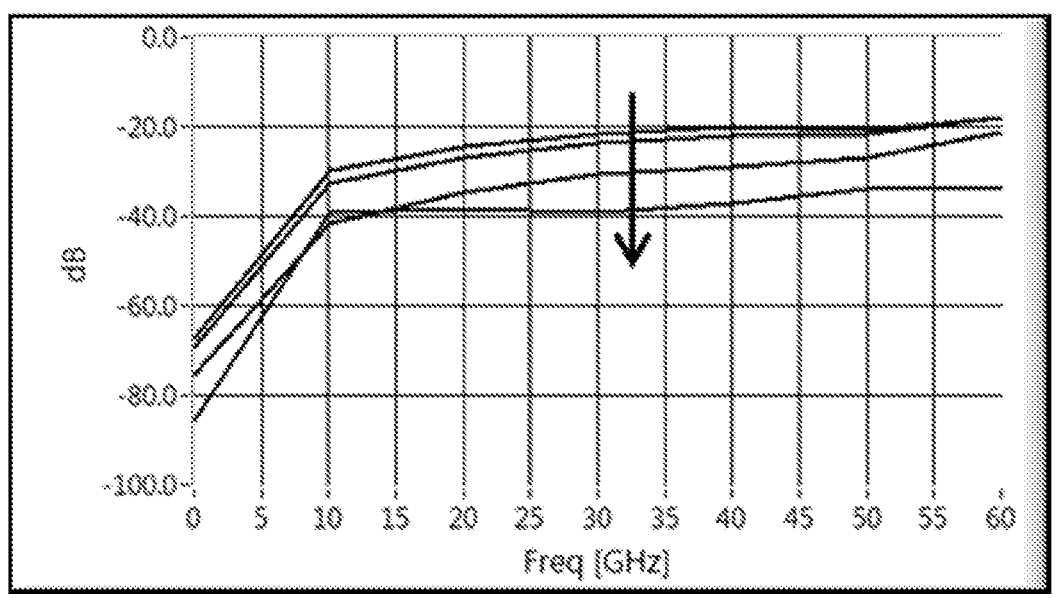
FIGS. 8A and 8B are graphs illustrating the cross-talk and S21 curve of the RF transmission array.
Figure 8B:
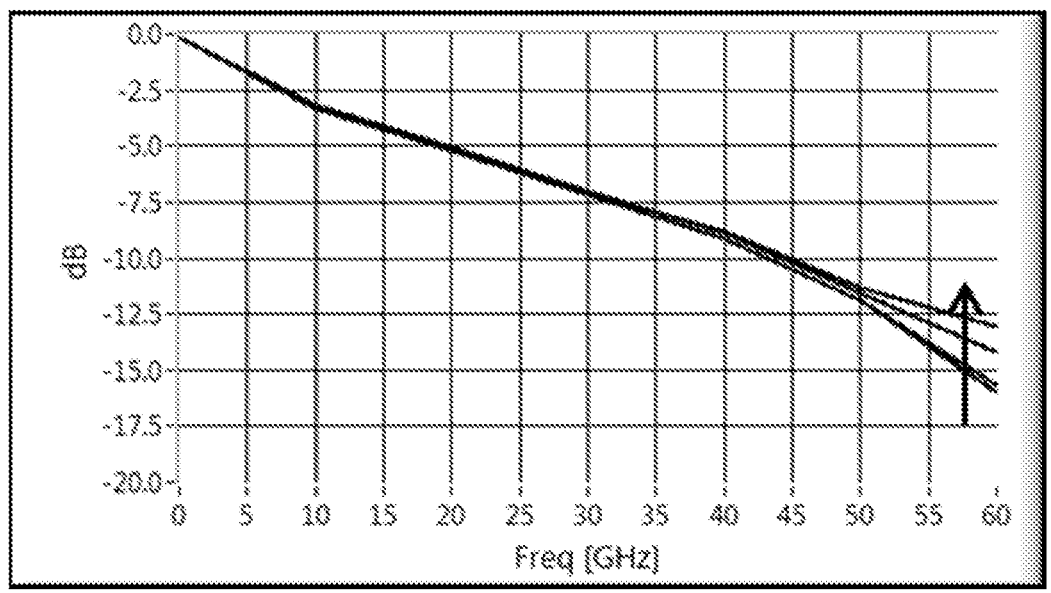

Providing the downwardly extending portion results in significant improvements to the cross-talk and S21 curve of the RF transmission line array, as shown in FIGS. 8A and B (where the arrow indicates increasing trench depth).

The downwardly extending portion may be in the centre of the ground electrode, i.e. equidistant from the transmission lines adjacent to the ground electrode, or it may be located off-centre. It may be that a downwardly extending portion is only provided in intermediate ground electrodes, i.e. in those which are between a pair of transmission lines (rather than at the edge of the array). Where there are multiple intermediate ground electrodes between a given pair of adjacent signal electrodes, the downwardly extending portion may be provided in one or more of them. As an example, if there are two intermediate ground electrodes between each transmission line, then each may have a downwardly extending portion which covers a wall of a trench between them, and the bottom of the trench may be non-conducting.

Figure 9:
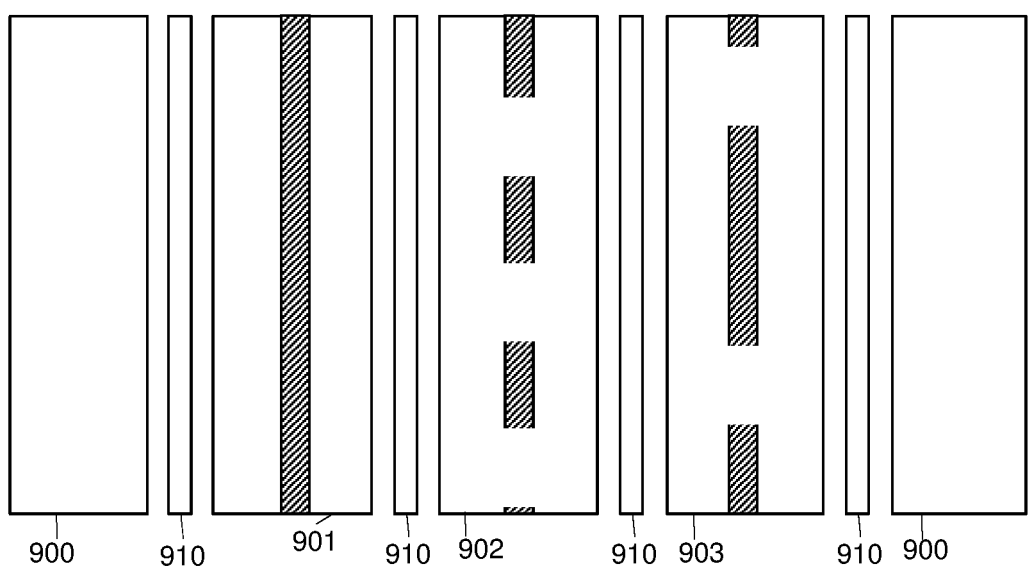
FIG. 9 is a schematic illustration of an RF waveguide array showing alternative arrangements for downwardly extending portions of ground electrodes.

The downwardly extending portion of the electrode may be provided along the whole length of the electrode, or only along a portion or several portions of that length. This is shown schematically in FIG. 9, which is a plan view showing the signal electrodes 910 and the ground electrodes 900-903. The locations of portions of the ground electrodes 900-903 which extend downwards are shown shaded. The non-intermediate ground electrodes 900 do not include portions extending downwards in this example. One ground electrode 901 has a portion extending downwards along the whole length of the electrode. The other ground electrodes 902 and 903 have several portions which extend downwards, each in a different portion of the length of the electrode. While each intermediate ground electrode is shown with a different arrangement in the figure, it is expected that all ground electrodes would use the same arrangement in practice—although the gaps between portions extending downwards may be offset.

The substrate is typically formed from lithium niobate (LiNbO$_3$), although it will be appreciated that this approach is not limited to LiNbO$_3$ and may be applicable to other materials, including semiconductors (such as, for example, indium phosphide or silicon). The trench may be formed by laser ablation, or any other suitable etching process. The performance improves with the depth of the downwardly extending portion, though there is obviously a practical limit close to the depth of the substrate. The trench depth may be, for example, at least 10 microns, at least 25 microns, at least 50 microns, or at least 100 microns. The downwardly extending portion of the ground electrode may be the same depth as the trench, or may extend only part-way down the trench. The downwardly extending portion may extend to at least 10 microns, at least 25 microns, at least 50 microns, at least 80 microns, or at least 100 microns. The greater the depth to which the downwardly extending portion extends, the greater the reduction in crosstalk will be. The width of the trench downwardly extending portion is chosen primarily for fabrication reasons, and may be between 40 and 240 microns, depending on the separation of the signal lines.

An RF waveguide array incorporating downwardly extending portions in the ground electrode may be used as part of a dual parallel in-phase/quadrature, I/Q, modulator, where the waveguides associated with each signal electrode are configured to form a Mach-Zehnder modulator.

The invention claimed is:

1. A radio frequency (RF) waveguide array comprising:
a substrate comprising a plurality of optical waveguides, each waveguide, of the plurality of optical waveguides, being elongate in a first direction; and
an electrical RF transmission line array located on a face of the substrate and comprising:
a plurality of signal electrodes; and
a plurality of ground electrodes,
each of plurality of signal electrodes and the plurality of ground electrodes extending in the first direction;
wherein:
each signal electrode, of the plurality of signal electrodes, is positioned to provide a signal to two respective waveguides,
the plurality of ground electrodes including at least one intermediate ground electrode positioned between a pair of signal electrodes of the plurality of signal electrodes,
each intermediate ground electrode, of the at least one intermediate ground electrode, includes a top planar surface, the top planar surface including an indentation between two side portions of the intermediate ground electrode, the indentation defining a depression in the intermediate ground electrode,
each intermediate ground electrode, of the at least one intermediate ground electrode, includes a portion extending below the plurality of optical waveguides and into the substrate, and
each depression, in each intermediate ground electrode, extends below the plurality of optical waveguides into the portion extending below the plurality of optical waveguides and into the substrate.

2. The RF waveguide array of claim 1, wherein the portion extending below the plurality of optical waveguides and into the substrate comprises a coating on a wall of a trench in the substrate.

3. The RF waveguide array of claim 1, wherein the portion extending below the plurality of optical waveguides and into the substrate comprises a portion which fills a trench in the substrate.

4. The RF waveguide array of claim 1, wherein the portion extending below the plurality of optical waveguides and into the substrate is made from a metal which is different to a metal of another portion of the at least one intermediate ground electrode.

5. The RF waveguide array of claim 1, wherein the portion extending below the plurality of optical waveguides and into the substrate extends at least 10 microns into the substrate.

6. The RF waveguide array of claim 1, wherein the portion extending below the plurality of optical waveguides and into the substrate is positioned equidistant between each signal electrode of the pair of signal electrodes.

7. The RF waveguide array of claim 1, wherein the portion extending below the plurality of optical waveguides and into the substrate extends along a length of the at least one intermediate ground electrode.

8. The RF waveguide array of claim 1, wherein
each intermediate ground electrode comprises multiple portions extending below the plurality of optical waveguides and into the substrate, and
each portion, of the multiple portions, extends along a discrete section of a length of a corresponding intermediate ground electrode.

9. A dual parallel in-phase/quadrature modulator comprising an RF waveguide array according to claim 1, wherein waveguides associated with each signal electrode, of the plurality of signal electrodes, are configured to form a Mach-Zehnder modulator.

10. A dual parallel in-phase/quadrature modulator comprising a radio frequency (RF) waveguide array comprising:
   a substrate comprising a plurality of optical waveguides, each waveguide, of the plurality of optical waveguides, being elongate in a first direction; and
   an electrical RF transmission line array located on a face of the substrate and comprising:
      a plurality of signal electrodes; and
      a plurality of ground electrodes,
         each of plurality of signal electrodes and the plurality of ground electrodes extending in the first direction;
   wherein:
      each signal electrode, of the plurality of signal electrodes, is positioned to provide a signal to two respective waveguides,
      the plurality of ground electrodes including at least one intermediate ground electrode positioned between a pair of signal electrodes of the plurality of signal electrodes,
      each intermediate ground electrode, of the at least one intermediate ground electrode, includes a top planar surface, the top planar surface including an indentation between two side portions of the intermediate ground electrode, the indentation defining a depression in the intermediate ground electrode,
      each intermediate ground electrode, of the at least one intermediate ground electrode, includes a portion extending below the plurality of optical waveguides and into the substrate, and
      each depression, in each intermediate ground electrode, extends below the plurality of optical waveguides into the portion extending below the plurality of optical waveguides and into the substrate.

11. The dual parallel in-phase/quadrature modulator of claim 10, wherein the portion extending below the plurality of optical waveguides and into the substrate comprises a coating on a wall of a trench in the substrate.

12. The dual parallel in-phase/quadrature modulator of claim 10, wherein the portion extending below the plurality of optical waveguides and into the substrate comprises a portion which fills a trench in the substrate.

13. The dual parallel in-phase/quadrature modulator of claim 10, wherein the portion extending below the plurality of optical waveguides and into the substrate is made from a metal which is different to a metal of another portion of the at least one intermediate ground electrode.

14. The dual parallel in-phase/quadrature modulator of claim 10, wherein the portion extending below the plurality of optical waveguides and into the substrate extends at least 10 microns into the substrate.

15. The dual parallel in-phase/quadrature modulator of claim 10, wherein the portion extending below the plurality of optical waveguides and into the substrate is positioned equidistant between each signal electrode of the pair of signal electrodes.

16. The dual parallel in-phase/quadrature modulator of claim 10, wherein the portion extending below the plurality of optical waveguides and into the substrate extends along a length of the at least one intermediate ground electrode.

17. The dual parallel in-phase/quadrature modulator of claim 10, wherein
   each intermediate ground electrode comprises multiple portions extending below the plurality of optical waveguides and into the substrate, and
   each portion, of the multiple portions, extends along a discrete section of a length of a corresponding intermediate ground electrode.

* * * * *